(12) United States Patent
Ishimoto et al.

(10) Patent No.: US 7,613,082 B2
(45) Date of Patent: Nov. 3, 2009

(54) OPTICAL PICKUP DEVICE, OPTICAL RECORDING AND REPRODUCING APPARATUS AND GAP DETECTION METHOD

(75) Inventors: Tsutomu Ishimoto, Saitama (JP); Kimihiro Saito, Saitama (JP)

(73) Assignee: Sony Corporation, Tokyo (JP)

( * ) Notice: Subject to any disclaimer, the term of this patent is extended or adjusted under 35 U.S.C. 154(b) by 808 days.

(21) Appl. No.: 11/118,559

(22) Filed: May 2, 2005

(65) Prior Publication Data
US 2005/0259530 A1 Nov. 24, 2005

(30) Foreign Application Priority Data
May 18, 2004 (JP) ............... 2004-148012

(51) Int. Cl.
*G11B 7/00* (2006.01)
(52) U.S. Cl. ............... 369/44.32; 369/13.33; 369/53.19; 369/112.24
(58) Field of Classification Search ... 369/53.11–53.13, 369/53.27
See application file for complete search history.

(56) References Cited
U.S. PATENT DOCUMENTS

| | | | |
|---|---|---|---|
| 6,717,896 B1 * | 4/2004 | Imanishi | 369/53.27 |
| 6,845,066 B1 * | 1/2005 | Shingo | 369/44.23 |
| 7,002,886 B2 * | 2/2006 | Chu et al. | 369/53.19 |
| 2002/0041542 A1 * | 4/2002 | Sano et al. | 369/44.23 |
| 2006/0274610 A1 | 12/2006 | Saito et al. | |

* cited by examiner

*Primary Examiner*—Wayne R Young
*Assistant Examiner*—Adam R Giesy
(74) *Attorney, Agent, or Firm*—Oblon, Spivak, McClelland, Maier & Neustadt, L.L.P.

(57) ABSTRACT

An optical pickup device comprising at least a light source, an optical unit for irradiating an optical recording medium with a plurality of lights from this light source, a head unit located in an opposing relation to the optical recording medium and converging a plurality of lights emitted from the light source on a recording surface of the optical recording medium as near field light, a photo-detecting unit for detecting an angle between the head unit and the recording surface of the optical recording medium based on quantities of returned lights from the optical recording medium and a tilt control unit for controlling the tilt driving unit based on an angle detected by the photo-detecting unit so that an angle of the head unit relative to the recording surface is held constant. Then, an optical pickup device, an optical recording and reproducing apparatus and a tilt detection method are able to automatically control a tilt without requiring setting up an external sensor independently of an optical pickup.

19 Claims, 16 Drawing Sheets

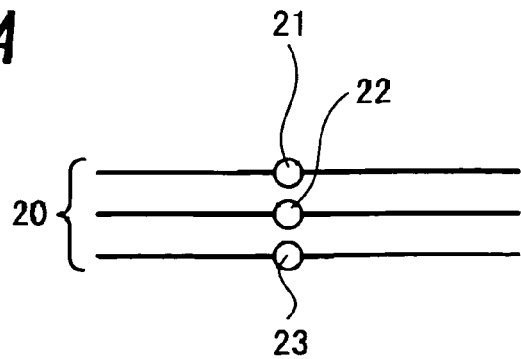
FIG. 2A
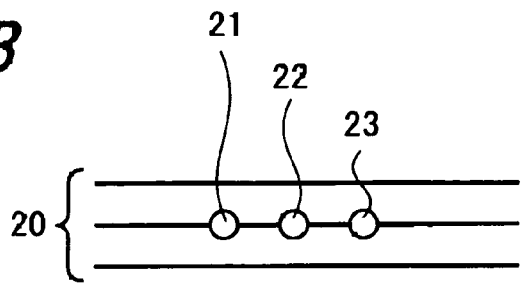
FIG. 2B
FIG. 3
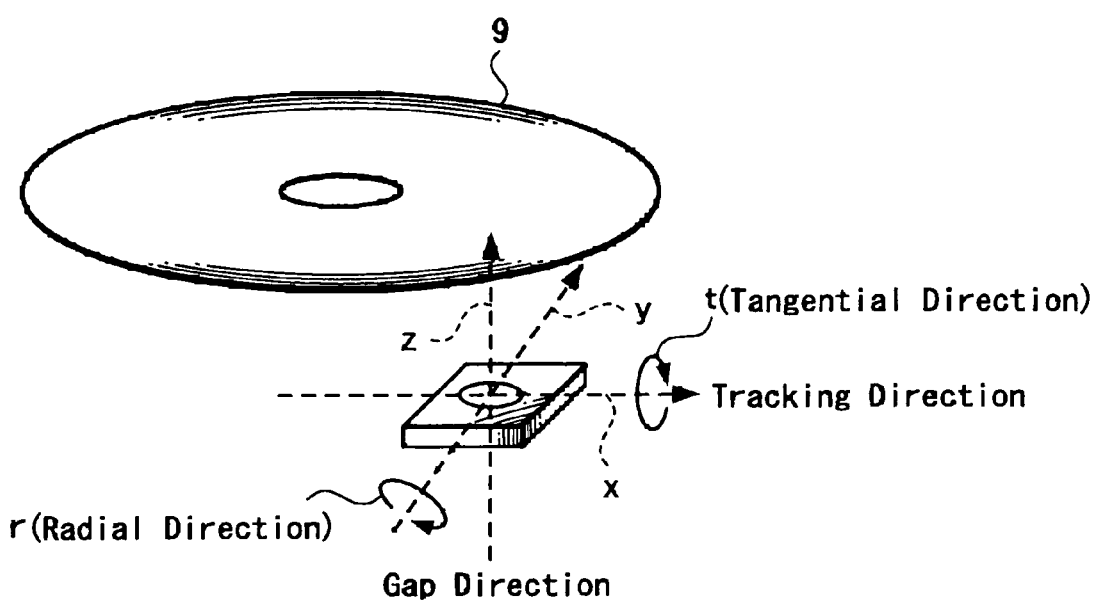

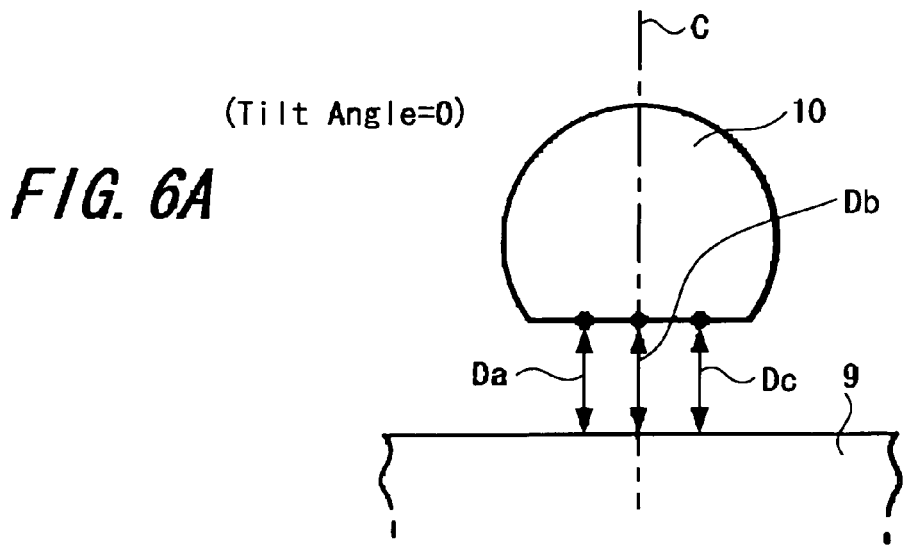
FIG. 6A (Tilt Angle=0)
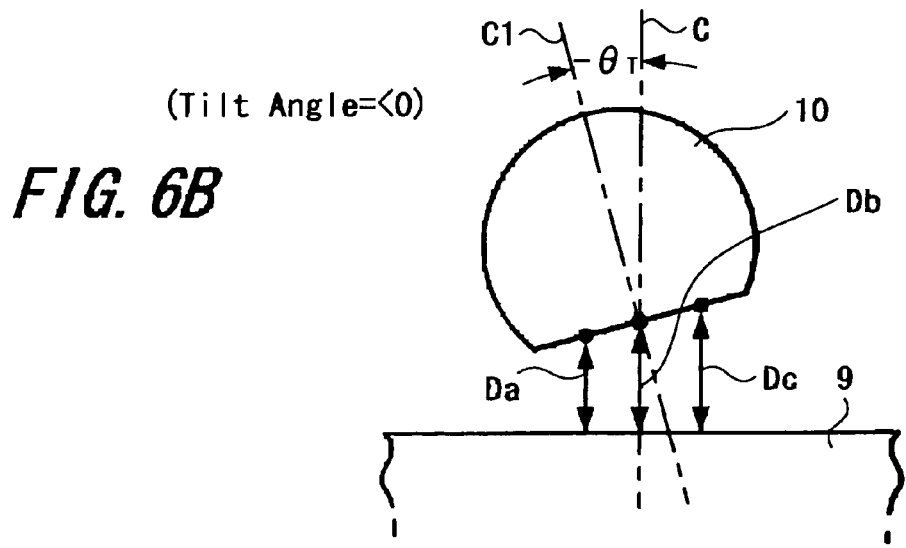
FIG. 6B (Tilt Angle=<0)
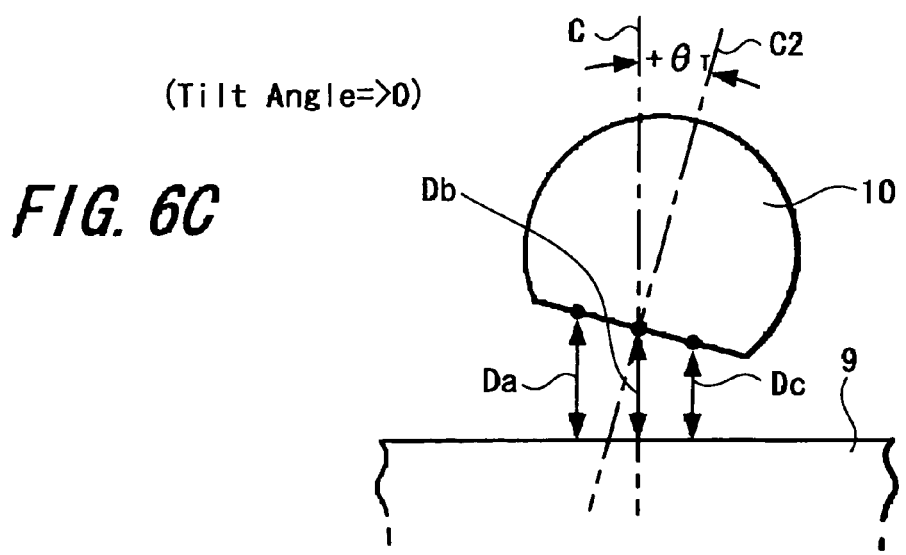
FIG. 6C (Tilt Angle=>0)

(When Light is Split Into Odd Number of Stots)

(When Light is Split Into Even Number of Stots)

OPTICAL PICKUP DEVICE, OPTICAL RECORDING AND REPRODUCING APPARATUS AND GAP DETECTION METHOD

CROSS REFERENCES TO RELATED APPLICATIONS

The present invention contains subject matter related to Japanese Patent Application JP 2004-148012 filed in the Japanese Patent Office on May 18, 2004, the entire contents of which being incorporated herein by references.

BACKGROUND OF THE INVENTION

1. Field of the Invention

The present invention relates to an optical pickup device, an optical recording and reproducing apparatus and a gap detection method suitable for use with an optical recording and reproducing apparatus which carries out at least one of recording and reproduction of signals by using near field light.

2. Description of the Related Art

In recent years, in accordance with an increasing request for increasing a recording density and a storage capacity, various methods have so far been proposed to record and reproduce an optical recording medium by irradiating the optical recording medium with near field light through a condensing lens having a large numerical aperture. As a condensing lens using such near field light, there has been proposed so far a condensing lens which can realize a numerical aperture greater than 1 by a combination of a solid immersion lens (hereinafter simply referred to as an "SIL") and an optical lens such as an aspherical lens.

In an optical recording and reproducing apparatus using near field light, a distance between an optical head and an end face of a tip end side lens such as an SIL and a signal recording surface of an optical recording medium is selected to be approximately ¼ of a wavelength of incident light, and it is requested that such distance should be selected to be lower than approximately 100 nm in a wavelength range of a light source which is now commercially available.

For this reason, even when such SIL is inclined very slightly, that is, such SIL has a so-called tilt angle, there is a possibility that the SIL will hit against the recording surface of the optical recording medium easily. If the SIL hits against the recording surface of the optical recording medium, then a disadvantage will occur, in which the recording surface of the optical recording medium will be damaged. As a result, there is a risk that the optical recording medium cannot be recorded or reproduced normally.

Relative to the near field optical system using near field light, in an optical pickup device with an ordinary optical system that does not use near field light, that is, so-called far-field optical system, there has been proposed a method in which tilt detection laser light is separated from laser light by a diffraction grating, focusing signals at respective beam spots are calculated by a suitable method such as an astigmatism method and a knife edge method and tilts being corrected so that calculated focusing signals may become equal to each other (see Cited Patent Reference 1, for example).

Also, in an ordinary optical pickup device which does not use near field light similarly, there has been proposed a method in which tilt detection laser light is separated from laser light, a tilt quantity being calculated from a plurality of beam spots by a tilt sensor (see Cited Patent Reference 2, for example).

[Cited Patent Reference 1]: Official Gazette of Japanese laid-open patent application No. 2002-197699

[Cited Patent Reference 2]: Official Gazette of Japanese laid-open patent application No. 2000-155969

However, the optical pickup device using near field light may not detect a tilt or a gap by using the focusing signal according to the above-mentioned related-art methods.

Further, when an external tilt sensor or gap sensor is in use, an arrangement of an optical pickup device becomes complex and hence a problem arises, in which a cost of the optical pickup device will be increased unavoidably. Alternatively, since the position at which a tilt or gap is detected by the external sensor and the recording and reproducing position are different from each other, phases of the tilt detection position or the gap detection position and the recording and reproducing position should be matched separately.

SUMMARY OF THE INVENTION

In view of the aforesaid aspects, the present invention intends to provide an optical pickup device and an optical recording and reproducing apparatus for recording and/or reproducing an optical recording medium by near field light and the present invention also intends to provide an optical pickup device, an optical recording and reproducing apparatus and a gap detection method capable of automatically controlling a tilt and/or a gap without setting up an external sensor independently of an optical pickup for recording and/or reproducing the optical recording medium.

According to an aspect of the present invention, there is provided an optical pickup device which is comprised of a light source for generating a plurality of lights, a head unit located in an opposing relation to an optical recording medium and irradiating a plurality of lights emitted from the light source on the optical recording medium as near field lights and a photo-detecting unit for detecting a gap between the head unit and a recording surface of the optical recording medium based on quantities of returned lights from the head unit.

Also, according to the present invention, the above-mentioned optical pickup device further comprises a gap driving unit for adjusting a distance between the unit and the recording surface of the optical recording medium and a gap control unit for controlling the gap driving unit based on the distance detected by the photo-detecting unit so that a distance of the head unit relative to the recording surface is held constant.

Further, according to the present invention, in the above-mentioned optical pickup device, a plurality of lights from a light source is light which is generated by splitting light from the light source.

Also, according to the present invention, the above-mentioned optical pickup device includes a plurality of light sources.

Further, according to the present invention, in the above-mentioned optical pickup device, when an angle is detected based on quantities of a plurality of returned lights, an angle is calculated from a difference between two values of quantities of a plurality of returned lights.

Also, according to the present invention, in the above-mentioned optical pickup device, when a distance between the head unit and the recording surface of the optical recording medium is detected based on quantities of a plurality of returned lights, the distance is detected based on a mean value of quantities of a plurality of returned lights or the distance is detected based on a quantity of returned light at the central position if the light has odd number of beam spots or the distance is detected based on a mean value of quantities of two returned lights at the central position if the light has even number of beam spots.

Further, according to other aspect of the present invention, there is provided an optical recording and reproducing apparatus for recording and/or reproducing an optical recording medium by irradiating the optical recording medium with light from a light source. This optical recording and reproducing apparatus is comprised of a light source for generating a plurality of lights, a head unit located in an opposing relation to the optical recording medium and irradiating a plurality of lights emitted from the light source on the optical recording medium as near field light and a photo-detecting unit for detecting a gap between the head unit and a recording surface of the optical recording medium based on quantities of a plurality of returned lights from the head unit.

Also, according to the present invention, the above-mentioned optical recording and reproducing apparatus further comprises a gap driving unit for adjusting a gap between the head unit and the recording surface of the optical recording medium, a photo-detecting unit for detecting a distance between the head unit and the recording surface of the optical recording medium based on quantities of a plurality of returned lights from the head unit and a gap control unit for controlling the gap driving unit based on the distance detected by the photo-detecting unit so that a distance of the head unit relative to the recording surface is held constant.

Also, according to a further aspect of the present invention, there is provided a detection method which is comprised of the steps of detecting quantities of a plurality of returned lights from a head unit by irradiating an optical recording medium with a plurality of near field lights from the head unit and detecting a distance between a recording surface of the optical recording medium and the head unit by using a difference between two values of at least respective quantities of returned lights.

According to the optical pickup device of the present invention, in the optical pickup device using near field light in which the distance and angle between the head unit for irradiating near field light on the optical recording medium and the recording surface of the optical recording medium is detected from the quantity of returned light of a plurality of lights and in which the gap and the tilt can be decreased by automatically correcting the distance and angle between the head unit and the recording surface of the optical recording medium with the gap control unit, the gap driving unit, the tilt control unit and the tilt driving unit, the optical head unit can be stably opposed to the optical recording medium without using the external gap sensor and external tilt sensor.

Also, according to the present invention, it is possible to provide the optical pickup device including the gap driving unit and the gap control unit and in which both of the tilt and the gap can be automatically controlled by controlling the distance between the optical head unit and the recording surface of the optical recording medium based on the quantities of the returned lights detected by using a plurality of light beams.

Also, in the optical pickup device according to the present invention, since light from the light source is split by a suitable means such as a diffraction grating and a plurality of light beams is used, the tilt can be controlled relatively by the optical pickup device of the relatively simple arrangement.

Also, in the optical pickup device according to the present invention, the sufficient quantities of returned lights can be obtained by using light beams from a plurality of light sources and hence the tilt can be controlled with high accuracy.

Further, when the distance between the head unit and the recording surface of the optical recording medium is less than a distance in which near field light is produced, that is, it is a distance selected to be approximately ¼ of a wavelength of incident light, since a part of light introduced at an angle in which incident light is totally reflected is leaked from the end face of the suitable lens such as the SIL at the tip end side of the optical head unit, the quantity of returned light is decreased in response to the distance. When the lens has the tilt, if the quantity of the returned light is detected by irradiating the optical recording medium with a plurality of lights, then since the distance between the optical head unit and the recording surface becomes different depending on the amount of tilt, the quantity of returned light becomes different. As a result, it is possible to easily detect the amount of tilt, that is, the angle between the optical head unit and the recording surface by detecting this difference.

Therefore, in the optical pickup device according to the present invention, it is possible to easily and reliably detect the angle between the head unit and the recording surface of the optical recording medium by using the tilt detection method of the present invention in which the angle is detected from the difference between at least two detected values of quantities of a plurality of light beams.

Also, in the optical pickup apparatus according to the present invention, when the distance between the head unit and the recording surface of the optical recording medium is detected, since the distance is detected by the mean value of the quantities of a plurality of returned light beams or the quantity of the returned light at the central position if light has odd number of beam spots or the mean value of the two quantities of returned lights at the central position if light has even number of beam spots, it is possible to provide the optical pickup device in which the distance between the head unit and the recording surface can be easily and relatively detected in addition to the detection of the tilt and which can automatically control the tilt and the gap.

Also, since the optical recording and reproducing apparatus is constructed by using the optical pickup device according to the present invention, it is possible to provide the optical recording and reproducing apparatus using near field light in which the tilt of the head unit for irradiating near field light on the optical recording medium can be decreased, the head unit can be opposed to the recording surface of the optical recording medium more stably to record and/or reproduce the optical recording medium and which is excellent in recording and reproducing characteristics.

Further, in the optical recording and reproducing apparatus according to the present invention, since gap control for adjusting the distance between the head unit and the recording surface of the optical recording medium is executed by using quantities of a plurality of returned lights, it is possible to provide the optical recording and reproducing apparatus in which the head unit can be opposed to the optical recording medium more reliably to stably record and/or reproduce the optical recording medium.

BRIEF DESCRIPTION OF THE DRAWINGS

FIG. 2A is a schematic plan view showing an example of the state in which beam spots of light beams are located on an optical recording medium by the optical pickup device according to the present invention;

FIG. 2B is a schematic plan view showing another example of the state in which beam spots of light beams are located on the optical recording medium by the optical pickup device according to the present invention;

FIG. 3 is a schematic diagram used to explain the radial direction and the tangential direction;

FIG. 6A is a diagram used to explain a tilt angle of the optical pickup device in the case in which a tilt angle is equal to zero;

FIG. 6B is a diagram used to explain a tilt angle of the optical pickup device in the case in which a tilt angle is smaller than zero;

FIG. 6C is a diagram used to explain a tilt angle of the optical pickup device in the case in which a tilt angle is larger than zero;

DESCRIPTION OF THE PREFERRED EMBODIMENTS

Embodiments of the present invention will now be described in detail with reference to the drawings but it is needles to say that the present invention is not limited to the embodiments which will follow.

(1) First Embodiment

A first embodiment of the present invention will now be described with reference to the drawings.

Figure 1:
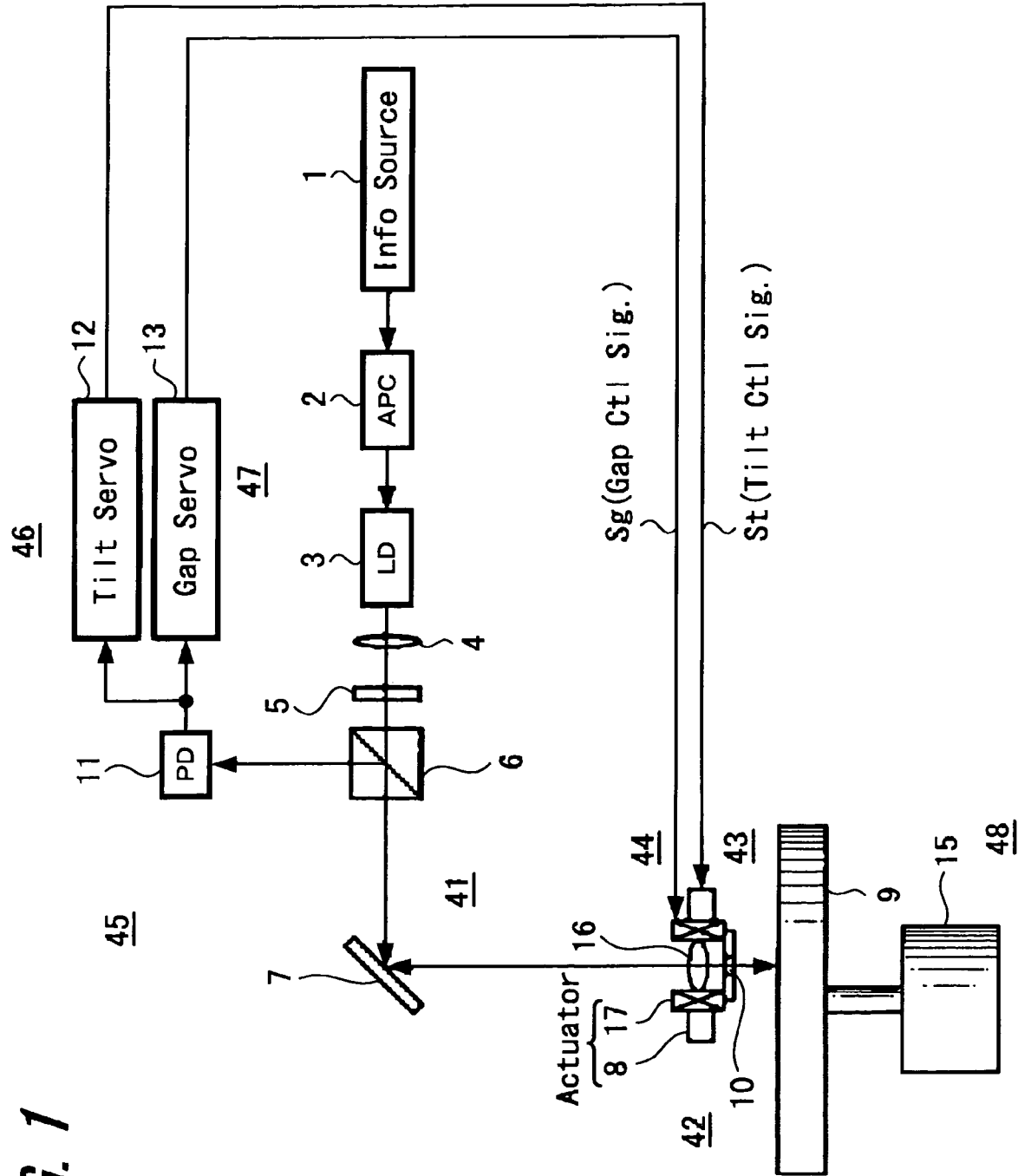
FIG. 1 is a schematic block diagram showing an arrangement of an example of an optical recording and reproducing apparatus including an optical pickup device according to the present invention.

FIG. 1 of the accompanying drawings is a schematic block diagram showing an arrangement of an example of an optical recording and reproducing apparatus including an optical pickup device according to the present invention. This embodiment illustrates an example in which light emitted from one light source is split into a plurality of light beams by a diffraction grating (that is, grating) and in which a plurality of light beams is irradiated on an optical recording medium 9 by a head unit 42 as near field light. Also, this embodiment illustrates an example in which there are provided a gap control unit 47 and a gap control driving unit 44 together with a tilt control unit 46 and a tilt driving unit 43 to control the gap between the head unit 42 and the optical recording medium 9.

As shown in FIG. 1, this embodiment illustrates an example in which light is irradiated on the optical recording medium 9 when information is recorded on the disk-like recording medium 9 based on information from an information source 1. More specifically, a light beam emitted from a light source 3 made of a suitable device such as a laser diode (LD) is modulated in response to an information signal by the information source 1 and an output is controlled by an automatic power control means (APC) 2. Light emitted from the automatic power control means 2 is introduced into an optical unit 41, in which it is collimated into parallel light by a collimator lens 4, it is split into a plurality of light beams by a diffraction grating 5, these light beams being introduced through a beam splitter 6 and a mirror 7 into the head unit 42. The head unit 42 includes an optical system to illuminate the optical recording medium 9 with near field light by a condensing lens with a numerical aperture greater than 1 composed of a solid immersion lens (SIL) 10 and an optical lens 16 formed of a suitable lens such as an aspherical lens. The head unit 42 has an arrangement in which the SIL 10 and the optical lens 16 are disposed on actuators 8 and 17 comprising the tilt driving unit 43 and the gap driving unit 44. Then, a light beam emitted from the optical unit 41 is irradiated on the optical recording medium 9 at its recording surface in which information is recorded by the head unit 42.

The optical recording medium 9 is held by a moving mechanism unit 48 formed of a suitable means such as a rotating means 15 for rotating the optical recording medium 9. According to the moving mechanism unit 48, in unison with a horizontal moving mechanism (not shown) which may move along the recording surface of the optical recording medium 9 on the side of the head unit 42, for example, in parallel to the recording surface, near field light illuminated from the head unit 42 scans the recording surface of the optical recording medium 9 along spiral or concentric recording tracks, for example.

While only one light path is shown in FIG. 1, FIGS. 2A and 2B are schematic plan views showing arrangements of beam spots 21 to 23 formed on the optical recording medium 9 when light emitted from the light source 3 is split into three light beams through the above-mentioned diffraction grating 5. FIG. 2A shows an example in which the beam spots 21 to 23 are arrayed in the direction perpendicular to the extending direction of the track 20, and FIG. 2B shows an example in which the beam spots 21 to 23 are arrayed in the direction parallel to the extending direction of the track 20.

As will be described later on, FIG. 2A shows an example in which a tilt in the radial direction can be detected by the direction in which the beam spots are arrayed, and FIG. 2B shows an example in which a tilt in the tangential direction can be detected by the direction in which the beam spots are arrayed.

As shown in FIG. 3, when broken lines x, y and z assume a tracking direction, a tangential direction of a circumference, for example, along which the tracks are extended and a so-called gap direction which adjusts a gap between the optical recording medium 9 and the head unit 42, a tilt in the radial direction and a tilt in the tangential direction are inclinations of the rotation directions of which rotary axes are the broken lines x and y as shown by arrows r and t.

The manner in which the thus arrayed beam spots are detected will be described again with reference to FIG. 1. In this case, light reflected from the optical recording medium 9 is reflected on the beam splitter 6 through the head unit 42 and it is detected by a photo-detecting unit 45 composed of a photo-detector (PD) 11.

The photo-detector (PD) 11 may have an arrangement including light-receiving units of the same number as that of beam spots in order to receive returned lights from a plurality of the above-mentioned beam spots although not shown.

Then, the quantity of the thus detected returned light is inputted into a tilt servo 12 and a gap servo 13, in which it is converted from a value of a detected quantity of light into a control signal based on a detection method which will be described later on. That is, in this case, a tilt control signal Sg and a gap control signal St are outputted and inputted into the tilt driving unit 43 and the gap driving unit 44 composed of the two actuators 8 and 17 and thereby the tilt and the gap can be corrected. As a result, the gap between the SIL 10 and the optical recording medium 9 can be held constant and the tilt between the end face of the SIL 10 and the optical recording medium 9 can be decreased to substantially zero, that is, the end face of the SIL 10 and the optical recording medium 9 can be held such that they may become substantially parallel to each other.

Figure 4:
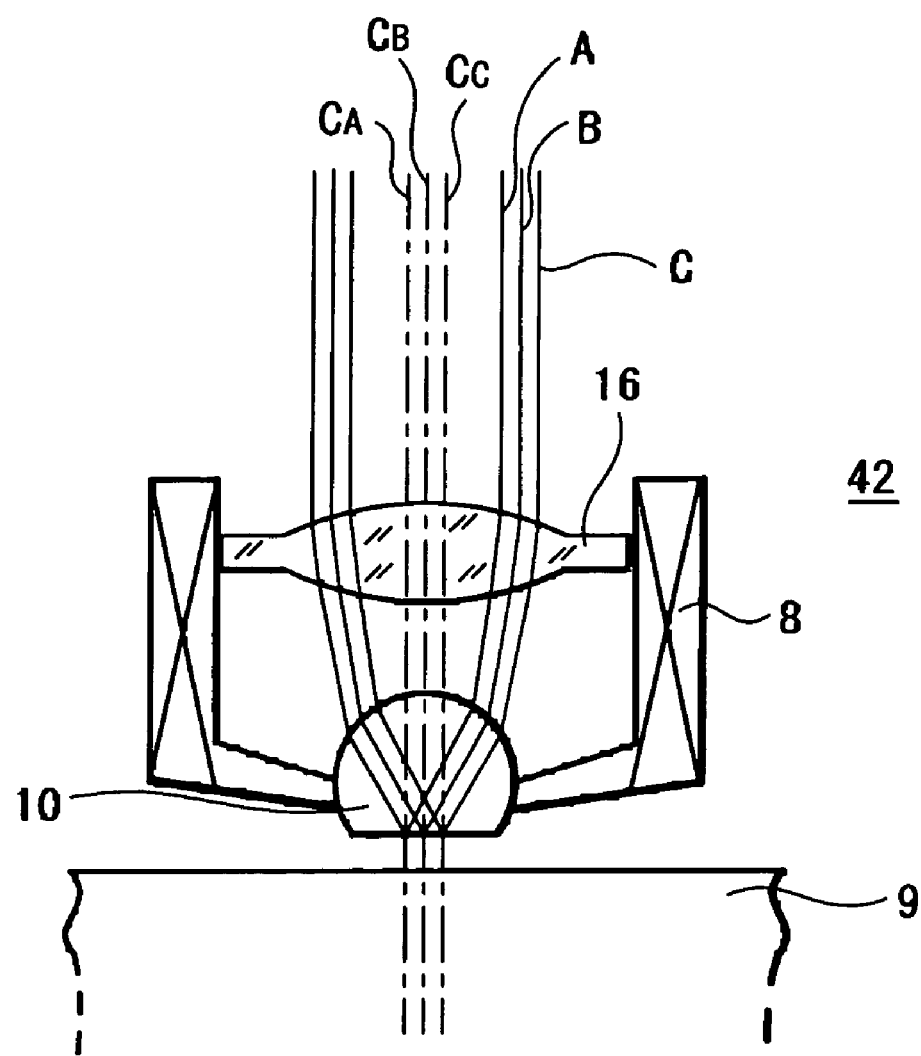
FIG. 4 is a schematic diagram of an arrangement showing the manner in which incident lights are introduced into the optical recording medium by the optical pickup device according to the present invention.

FIG. 4 is a schematic diagram of an arrangement showing the manner in which incident lights split by the diffraction grating are introduced through the head unit 42 into the optical recording medium 9. As shown in FIG. 4, the aspherical lens 16 and the SIL 10 are located, in that order, from the side of the light source and the head unit 42 for irradiating near field light on the optical recording medium 9 is installed on the actuator 8 such as a biaxial actuator. In the illustrated example, incident lights A, B and C split by the diffraction grating are introduced into the SIL 10 at the angle in which incident light is reflected in a total reflection fashion. In FIG. 4, dot-and-dash lines CA, CB and CC represent optical axes of the thus split incident lights. Lights leaked into the optical recording medium 9 from the three points focused at the SIL 10 at its end face opposing the optical recording medium 9 form the three beam spots 21 to 23 on the optical recording medium 9 as was already described with reference to FIG. 2.

Figure 5A:
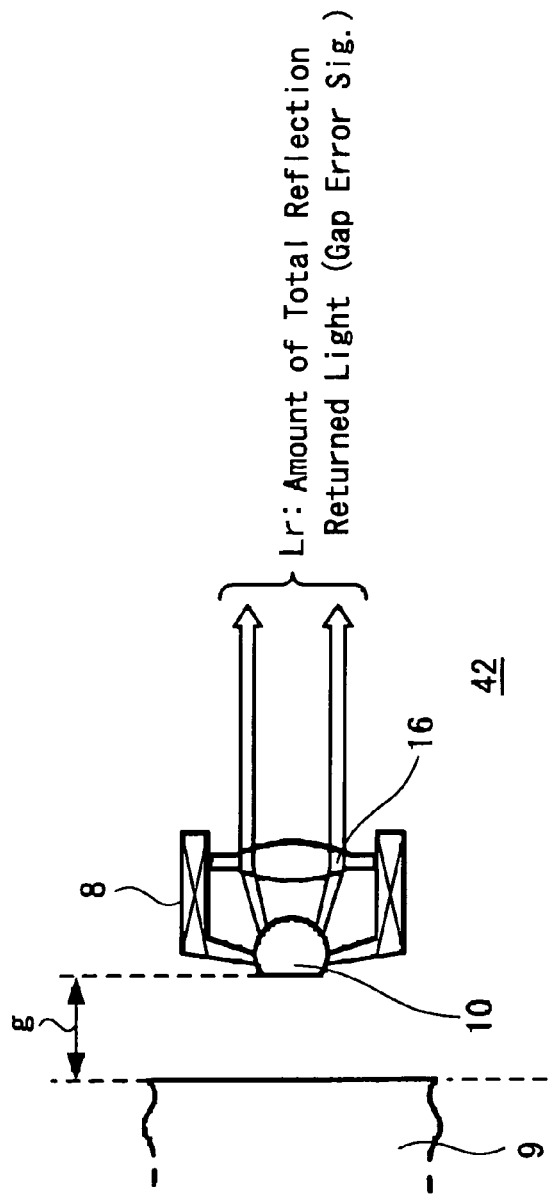
FIG. 5A is a schematic diagram of an arrangement showing a gap between an optical recording medium using near field light and a head unit.
Figure 5B:
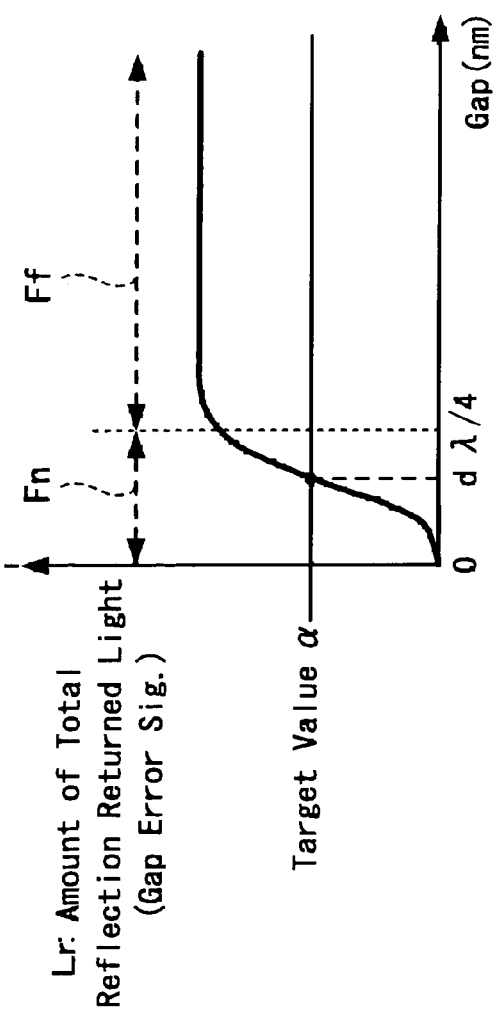
FIG. 5B is a diagram showing a relationship between a gap of the optical recording medium using near field light and a quantity of returned light.

Next, prior to the description of the tilt detection method according to the present invention, a method of controlling a gap between the SIL 10 and the optical recording medium 9 by using near field light will be described with reference to FIGS. 5A and 5B. FIG. 5A is a schematic diagram of an arrangement showing a gap between the optical recording medium 9 and the head unit 42, that is, a gap of the SIL 10 relative to the end face of the side of the optical recording medium 9. FIG. 5B is a diagram showing the manner in which a quantity of returned light of total reflection is changed relative to the gap. In FIG. 5A, elements and parts identical to those of FIG. 4 are denoted by identical reference numerals and therefore need not be described.

When the space (gap) between the SIL 10 and the optical recording medium 9 is selected to be greater than a distance in which the gap is less than ¼ of a wavelength of incident light to produce near field light, that is, in a far field region shown by a broken line arrow Ff in FIG. 5B, light introduced at an angle at which it is totally reflected on the end face of the SIL 10 is totally reflected on this end face so that a returned light quantity Lr is always constant as shown in FIG. 5B.

On the other hand, when the gap between the SIL 10 and the optical recording medium 9 becomes less than approximately ¼ of the wavelength $\lambda$ of the incident light and it becomes less than the distance in which near field light is generated, since a part of light introduced at an angle in which incident light is totally reflected is leaked from the end face of the SIL 10, the returned light quantity Lr is decreased. Then, since all incident lights on the optical recording medium 9 pass the optical recording medium 9 at the position in which the SIL 10 and the optical recording medium 9 contact with each other (that is, at the position in which the gap is zero), the returned light quantity Lr becomes zero.

As the change of the retuned light quantity in the gap area in which such near field light is generated occurs in the near field region shown by a broken line arrow Fn in FIG. 5B, there can be obtained a characteristic curve in which the returned light quantity begins to decrease gently as the gap approaches the optical recording medium 9 from the position at which the gap is substantially $\lambda/4$, it is decreased at the intermediate portion in a substantially linear fashion and which is progressively decreased gently in the region which further approaches the surface of the optical recording medium 9.

Accordingly, by using the fact that the total reflection returned light quantity is changed in a substantially linear fashion in a constant range relative to the gap length, the gap between the SIL 10 and the optical recording medium 9 is detected from the returned light quantity. Thus, when the gap is held at a constant value d, for example, the gap can be controlled to be constant by driving a suitable device such as the actuator 8 under control of the gap control unit so that the returned light quantity Lr may be held at a target value a corresponding to this gap.

Then, a tilt amount can be detected by using the above-mentioned gap detection method. This tilt detection method will be described with reference to FIGS. 6A to 6C.

In this case, there is illustrated an example in which incident light is split into three incident lights and then they are introduced into the SIL 10. Gaps from the positions at which the respective incident lights are focused on the end face of the SIL 10 to the recording surface of the optical recording medium 9 are shown by Da, Db and Dc, respectively.

In this case, let us assume that a distance between the SIL 10 and the optical recording medium 9 may be controlled to be constant at the target value α by the gap servo 13 shown in FIG. 1 under the condition that the total reflection returned light quantity described with reference to FIGS. 5A and 5B is used as the controlled quantity.

FIG. 6A shows the case in which the optical axis C of the SIL 10 is substantially vertical from the end face of the optical recording medium 9, the tilt angle being substantially zero. In this case, the three points at which incident lights are focused on the end face of the SIL 10 and the gap length of the recording medium 9 are expressed as:

$$Da=Db=Dc$$

Thus, the gap lengths are substantially equal to each other.

On the other hand, as shown in FIG. 6B, when the tilt between the SIL 10 and the optical recording medium 9 is not zero, that is, when the optical axis of the SIL 10 is inclined $-\theta_T$ from the optical axis C in which the tilt angle is zero to establish an inequality of tilt angle <0 as shown by a dot-and-dash line C1, the gap lengths from the three points at which the incident lights are focused on the end face of the SIL 10 to the optical recording medium 9 are expressed as:

$$Da<Db<Dc$$

Conversely, as shown in FIG. 6C, when the optical axis of the SIL 10 is inclined $+\theta_T$ from the optical axis C to establish an inequality of tilt angle >0 as shown by a dot-and-dash line C2, the gap lengths from the three points at which the incident lights are focused on the end face of the SIL 10 to the optical recording medium 9 are expressed as:

$$Da>Db>Dc$$

Figure 7A:
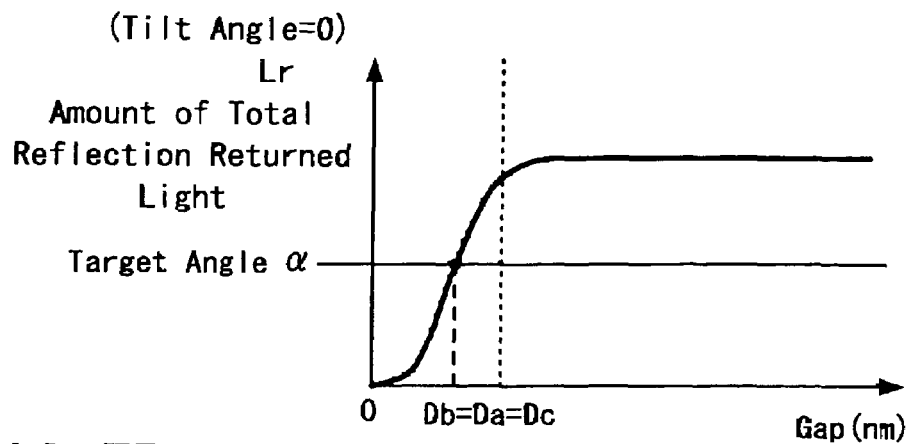
FIG. 7A is a diagram used to explain a relationship between a tilt angle and a quantity of returned light in the case in which a tilt angle is equal to zero.
Figure 7B:
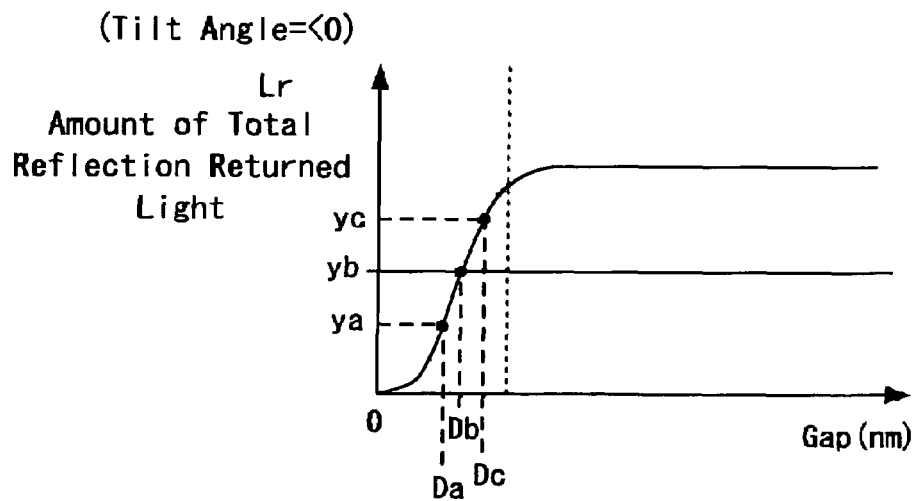
FIG. 7B is a diagram used to explain a relationship between a tilt angle and a quantity of returned light in the case in which a tilt angle is smaller than zero.
Figure 7C:
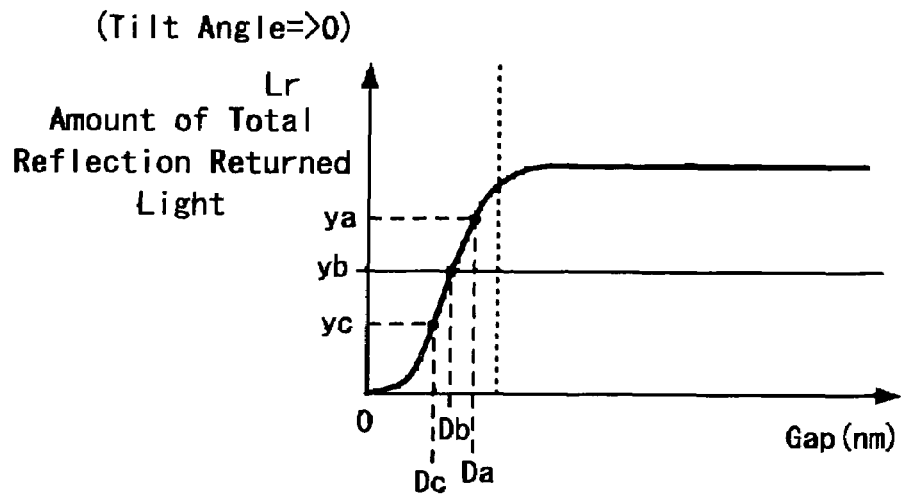
FIG. 7C is a diagram used to explain a relationship between a tilt angle and a quantity of returned light in the case in which a tilt angle is greater than zero.

The changes of these gap lengths can be equivalently expressed as shown in FIGS. 7A to 7C based on the total reflection returned light quantity, which has been described so far with reference to FIGS. 5A and 5B, and the tilt quantity can be detected from differences of these gap lengths.

That is, when the tilt angle is 0, $$ya=yb=yc=\alpha \text{ is established.}$$

Also, when the tilt angle <0 is satisfied, $$ya<yb<yc$$

$$yb=\alpha \text{ are established.}$$

Also, when the tilt angle >0 is satisfied, $$ya>yb>yc$$

$$yb=\alpha \text{ are satisfied.}$$

Accordingly, when ya−yc, for example, is detected as a tilt error and this tilt error is decreased up to zero under servo control by the tilt servo 12 in the condition in which this error is used as the controlled amount, the tilt between the SIL 10 and the optical recording medium 9 can be controlled so as to become substantially zero.

Also, when the tilt angle is calculated, the gaps between the respective beam spots can be adjusted by adjusting the angles of the diffraction grating 5 and the mirror 7, differences between the gaps can be calculated from the differences of the returned light quantity and the tilt angle can be calculated based on the calculated difference of the gaps.

The tilt servo 12 may be composed of a phase compensation filter, a PID (Proportional Integral Differential) controller and the like.

In this case, when the beam spots are located in the radial direction as was described before with reference to FIG. 2A, a tilt in the radial direction can be detected. Also, when the beam spots are located in the tangential direction as was described before with reference to FIG. 2B, a tilt in the tangential direction can be detected. Thus, the tilt in the radial direction and the tilt in the tangential direction can be corrected respectively.

Also, with reference to gap servo, when yb is used as the controlled amount and it can approach the target value a under control of the gap servo 13 as shown in FIGS. 7A to 7C, the gap between the SIL 10 and the optical recording medium 9 can be made constant. The gap servo 13 may be composed of the phase compensation filter, the PID controller and the like similarly to the tilt servo 12.

Figure 8A:
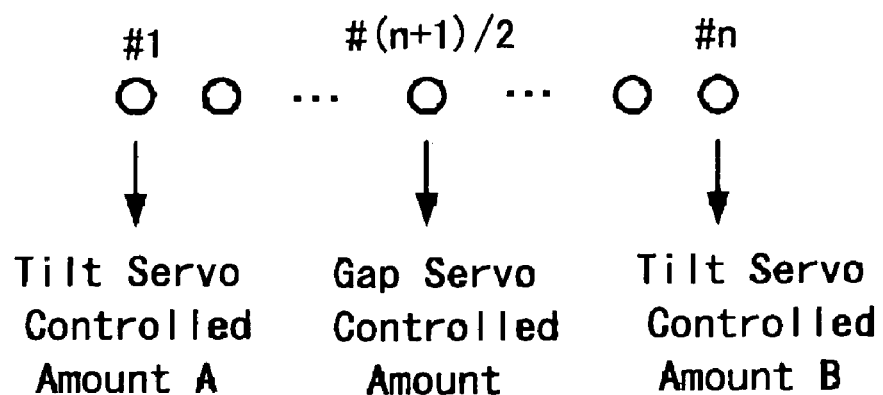
FIG. 8A is a diagram used to explain the case in which incident light is split into odd number of beam spots.
Figure 8B:
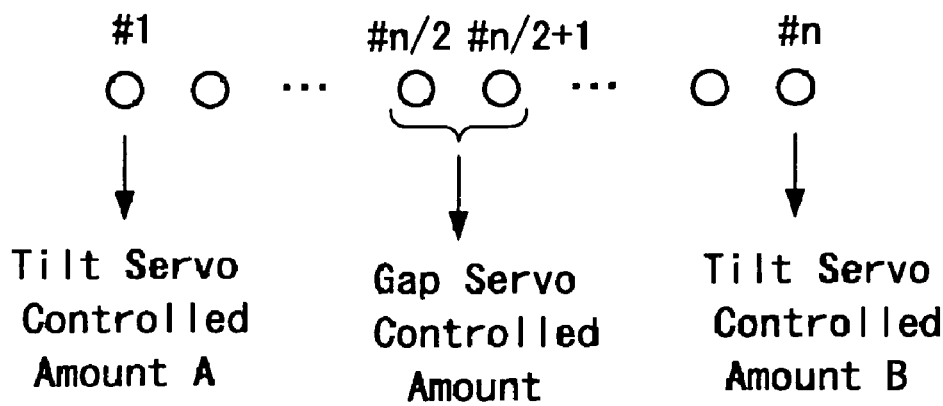
FIG. 8B is a diagram used to explain the case in which incident light is split into even number of beam spots.

While the incident light is split into three incident lights in the above-mentioned example, the case in which incident light is generally split into n incident lights will be described with reference to FIGS. 8A and 8B. In FIGS. 8A and 8B, #1 to #n assume first to nth beam spots, respectively.

First, when incident light is split into odd number of beam spots, as shown in FIG. 8A, a returned light quantity brought by a light beam which forms a central beam spot (beam spot shown by #(n+1)/2) corresponds to yb shown in FIGS. 7B and 7C. Alternatively, yb may assume a mean value of returned light quantities of light beams which form beam spots ranging from #1 to #n.

Also, returned light quantities of light beams which form beam spots (for example, #1 and #n or #2 and #n−1, etc.) which are located at the position symmetrical to the central beam spot (beam spot shown by #(n+1)/2) may correspond to ya and yc shown in FIGS. 7B and 7C, respectively. Reference letters ya and yc may assume mean values of a plurality of adjacent returned light quantities. For example, reference letter ya may assume a mean value of returned light quantities of the beam spots shown by #1 and #2 and hence various methods can be used.

Also, when the beam spot is generally split into even number of beam spots, as shown in FIG. 8B, the mean value of the returned light quantities brought by two beam spots (beam spots shown by #n/2 and #n/2+1) at the central portion corresponds to yb shown in FIGS. 7B and 7C. Alternatively, the mean value of the returned light quantities brought by the beam spots #1 to #n may be used as yb.

Also, the returned light quantities brought by the beam spots located at the position symmetrical to the central beam spots (two beam spots shown by #n/2 and #n/2+1) may respectively correspond to ya and yc shown in FIGS. 7B and 7C (for example, returned light quantities of light beams which form the beam spots shown by #1 and #n). Also in this case, reference letters ya and yc may assume mean values of a plurality of adjacent returned light quantities. For example, reference letter ya may assume a mean value of returned light quantities of light beams which form the beam spots shown by #1 and #2 and hence various methods can be used similarly to the case in which the beam spot is split into odd number of beam spots.

As set forth above, according to the present invention, when light emitted from one light source is split into a plurality of light beams by using the diffraction grating and irradiated on the optical recording medium 9, it is possible to easily and reliably detect the tilt amount between the head unit and the optical recording medium by detecting the returned light quantity of light beam, which forms each beam spot, from the end face of the SIL 10 with the photo-detector.

As described above, when light emitted from one light source is split into light beams by using the diffraction grating, it becomes possible to automatically control the tilt by the apparatus having the relatively simple arrangement.

Also, at least a part of quantity of light of returned light quantities which were detected at the same time can be used for controlling the gap and hence the gap and the tilt can be automatically, easily and precisely controlled by the simple arrangement.

(2) Second Embodiment

A second embodiment according to the present invention will be described next.

Figure 9:
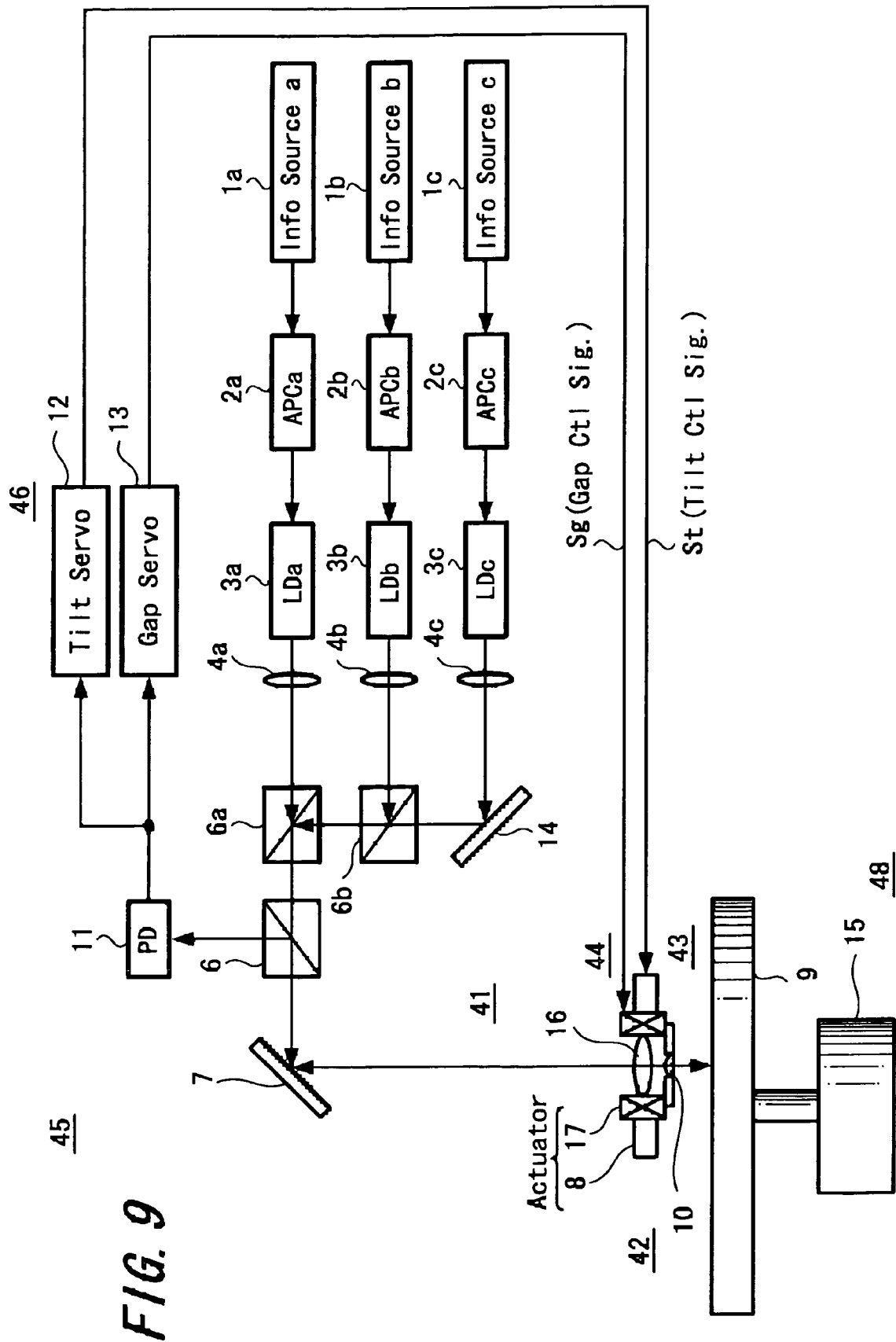
FIG. 9 is a schematic block diagram showing an arrangement of other example of an optical recording and reproducing apparatus including an optical pickup device according to the present invention.

While light emitted from one light source 3 (LD) is split by the diffraction grating 5 so that a plurality of beam spots may be formed on the optical recording medium 9 through the SIL 10 in the above-mentioned first embodiment, as shown in FIG. 9, it is possible to obtain a plurality of beam spots by using a plurality of light sources. In FIG. 9, elements and parts identical to those of FIG. 1 are denoted by identical reference numerals and therefore need not be described.

In this case, as shown in FIG. 9, different information signals from the three information sources 1a, 1b and 1c are inputted through the automatic power control means (APCa, APCb, APCc) 2a to 2c to the light sources 3a to 3c. Lights emitted from three light sources (LDa, LDb and LDc) 3a, 3b and 3c are respectively reflected by collimator lenses 4a, 4b and 4c, beam splitters 6a and 6b and a mirror 14 and thereby split into three light beams of which optical axes are shifted by one track each, for example, so that they can be irradiated on the adjacent three tracks on the recording surface of the optical recording medium 9 as near field lights through the head unit 42.

Figure 10:
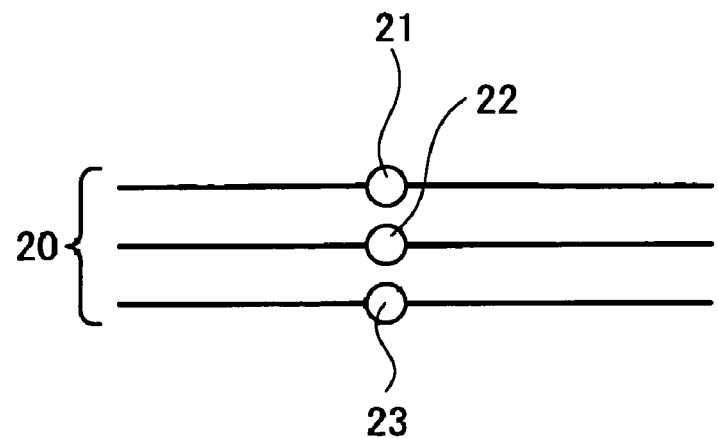
FIG. 10 is a schematic plan view showing an example of the state in which beam spots of light beams are located on the optical recording medium by the optical pickup device according to the present invention.

FIG. 10 is a schematic plan view showing the manner in which beam spots are located on the optical recording medium of this case. In this embodiment, since information can be recorded simultaneously by a plurality of beam spots, the beam spots 21 to 23 are located in the radial direction so that they may be located on the adjacent tracks 20 as shown in FIG. 10.

In the case of this arrangement, since information of three tracks can be recorded on the optical recording medium 9 at the same time, it is possible to increase a transfer rate of recording information as much as three times. Also, it is possible to automatically control the tilt easily and reliably by using the tilt detection method, which was described with reference to FIGS. 6A to 6C and FIGS. 7A to 7C, through these lights. At the same time, the gap also can be controlled with high accuracy.

In this case, since one light source is used for one beam spot, a sufficiently large quantity of returned light can be obtained, and hence it becomes possible to automatically control the tilt and the gap with relatively high accuracy.

(3) Third Embodiment

Figure 11:
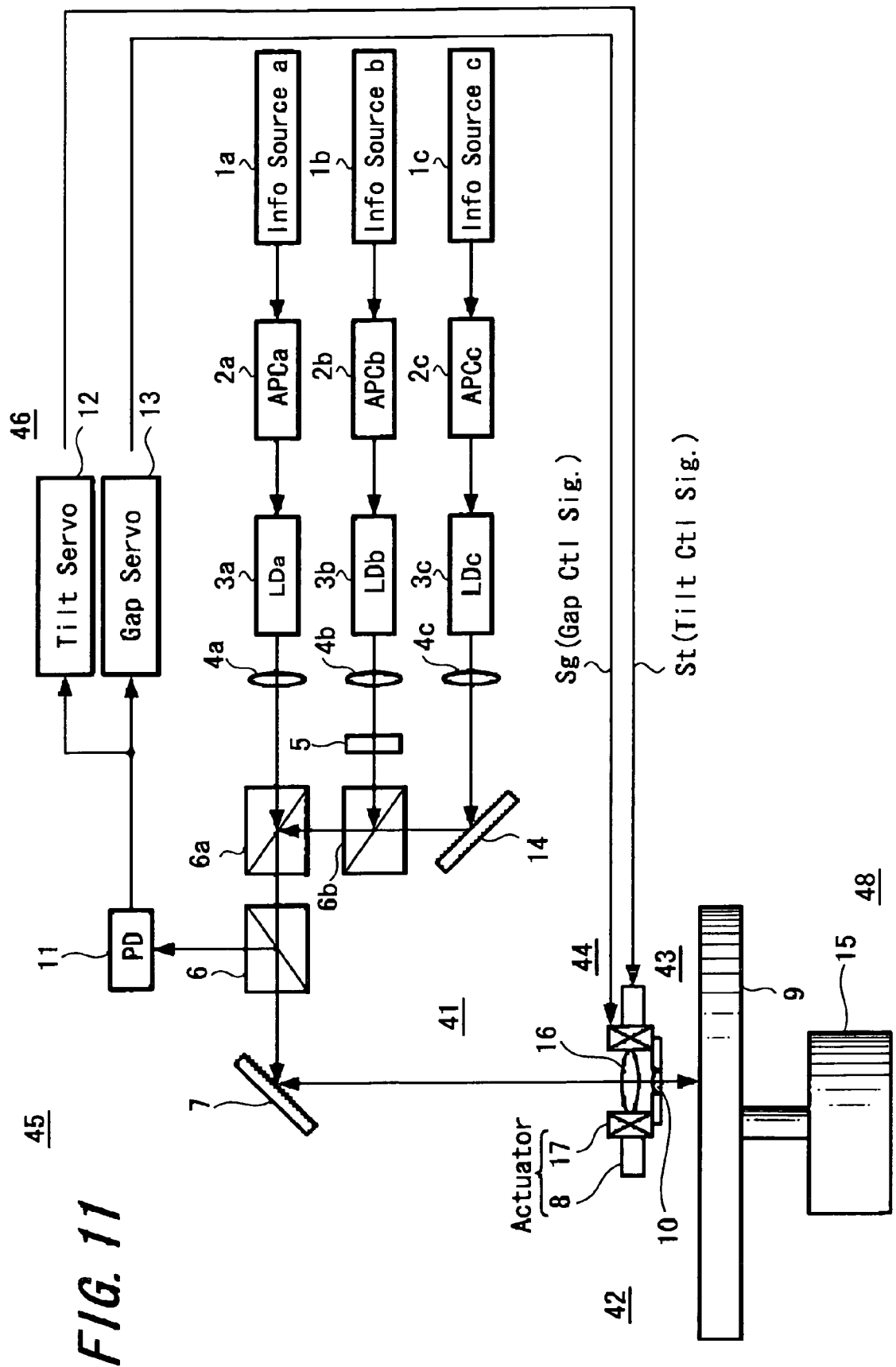
FIG. 11 is a schematic block diagram showing an arrangement of a further example of an optical recording and reproducing apparatus including an optical pickup device according to the present invention.

A third embodiment of the present invention will be described with reference to FIG. 11. In this embodiment, as shown in FIG. 11, similarly to the second embodiment shown in FIG. 9, there is illustrated the embodiment in which three light sources (LDa, LDb and LDc) 3a, 3b and 3c are used and in which the tilt in the radial direction and the tilt in the tangential direction can be controlled by using the diffraction grating 5. In this case, as shown in FIG. 11, the diffraction grating 5 is located on the light path of the light source 3b which constructs a central spot, for example. In FIG. 11, elements and parts identical to those of FIG. 9 are denoted by identical reference numerals and therefore need not be described.

Figure 12:
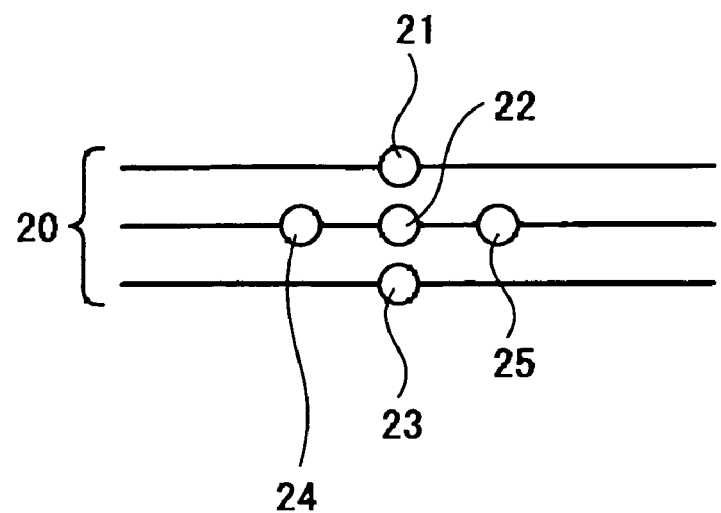
FIG. 12 is a schematic plan view showing an example of the state in which beam spots of light beams are located on the optical recording medium by the optical pickup device according to the present invention.

In this embodiment, as shown in FIG. 11, the diffraction grating 5 is located on the light path of one light source 3b of the three light sources 3a to 3c, that is, it is located between the collimator lens 4b and the beam splitter 6b. FIG. 12 is a schematic plan view showing the manner in which beam spots are located on the optical recording medium 9 according to this embodiment. As shown in FIG. 12, by properly selecting the diffraction direction of the diffraction grating 5, beam spots of lights from the light sources 3a to 3c can be located on the adjacent tracks 20. At the same time, sub-spots 24 and 25 can be located at both sides of the main beam spot of the light from the light source 3b along the recording track 20 through the diffraction grating 5.

According to this arrangement, since information of three track amounts can be simultaneously recorded on the optical recording medium 9, a transfer rate of recording information can be increased three times. Further, the tilt in the radial direction can be controlled based on the beam spots 21 to 23 across the tracks, and the tilt in the tangential direction can be controlled based on the beam spots 24, 22 and 25 arrayed on one track 20. At the same time, the gap can be controlled with high accuracy.

As described above, since the tilts in both radial and tangential directions can be controlled automatically, the tilts can be decreased more reliably and hence stable and excellent recording and reproduction can be carried out.

(4) Fourth Embodiment

Figure 13:
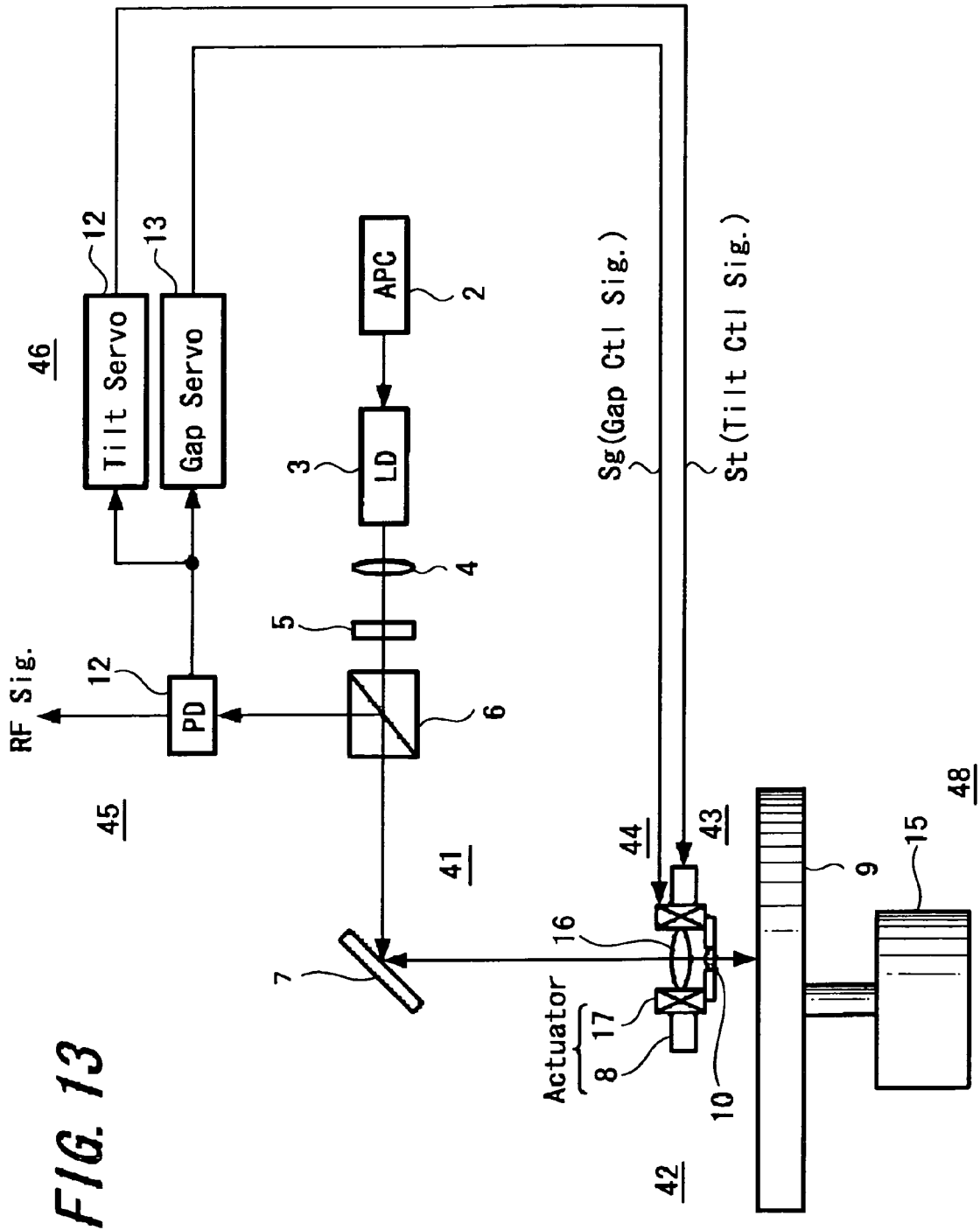
FIG. 13 is a schematic block diagram showing an arrangement of yet a further example of an optical recording and reproducing apparatus including an optical pickup device according to the present invention.
Figure 14A:
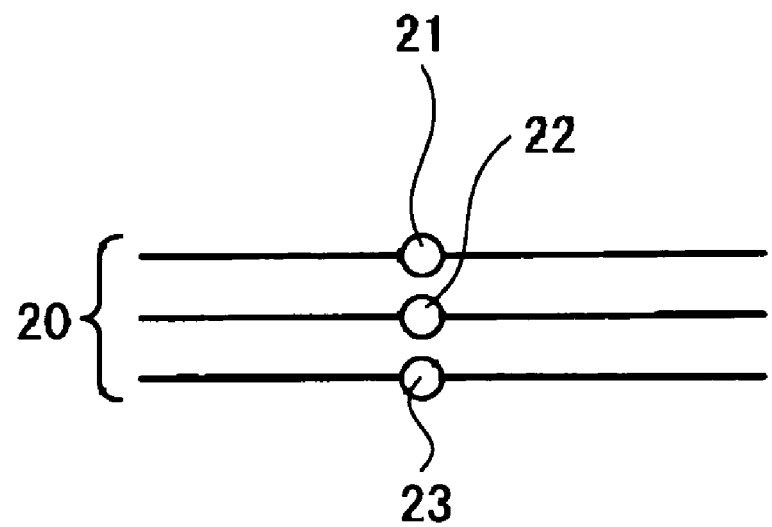
FIG. 14A is a schematic plan view showing an example of the state in which beam spots of light beams are located on the optical recording medium by the optical pickup device according to the present invention.
Figure 14B:
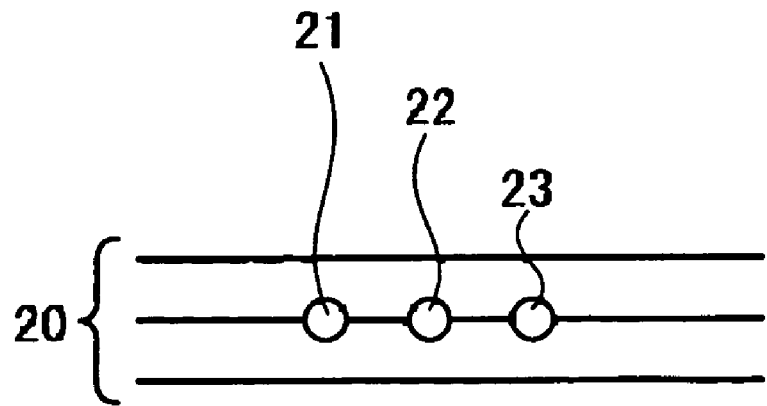
FIG. 14B is a schematic plan view showing other example of the state in which beam spots of light beams are located on the optical recording medium by the optical pickup device according to the present invention.

Next, a fourth embodiment in which the present invention is applied to a reproducing system of a recording and reproducing apparatus will be described. FIG. 13 is a schematic block diagram showing an arrangement of a reproducing apparatus used when a plurality of beam spots is formed on the optical recording medium 9 through the diffraction grating by using the light source 3 such as a laser. In FIG. 13, elements and part identical to those of FIG. 1 are denoted by identical reference numerals and therefore need not be described. FIGS. 14A and 14B are respectively schematic plan views showing the manner in which beam spots are located on the recording surface of the optical recording medium 9 in this case. These examples are similar to those of FIGS. 2A and 2B in which the present invention is applied to the recording and reproducing apparatus.

In this case, a quantity of returned light of a reproduced RF signal can be detected by the photo-detector (PD) 11. Also, a servo signal can be detected by observing the reproduced RF signal through a low-pass filter (not shown) and thereby error signals for the tilt servo 12 and the gap servo 13 can be obtained.

According to this arrangement, also in the reproducing system, the tilt and the gap can be automatically controlled satisfactorily and stable and excellent reproduction becomes possible.

(5) Fifth Embodiment

Figure 15:
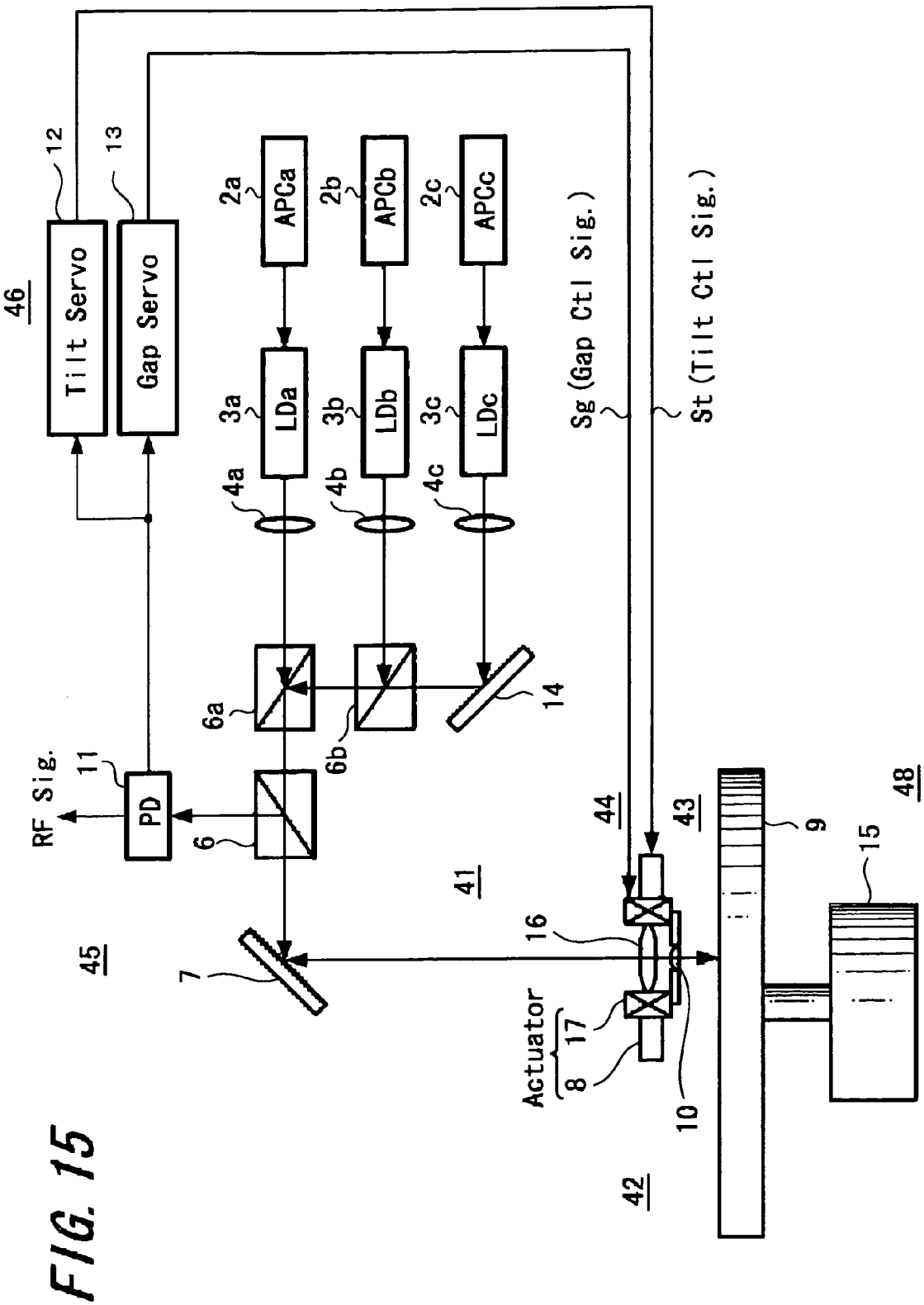
FIG. 15 is a schematic block diagram showing an arrangement of yet a further example of an optical recording and reproducing apparatus including an optical pickup device according to the present invention.

Next, a fifth embodiment in which the present invention is applied to a reproducing system of a recording and reproducing apparatus required when a plurality of beam spots is formed on an optical recording medium by using a light source such as three lasers will be described with reference to a schematic block diagram of FIG. 15. In FIG. 15, elements and parts identical to those of FIGS. 1 and 9 are denoted by identical reference numerals and therefore need not be described.

Figure 16A:
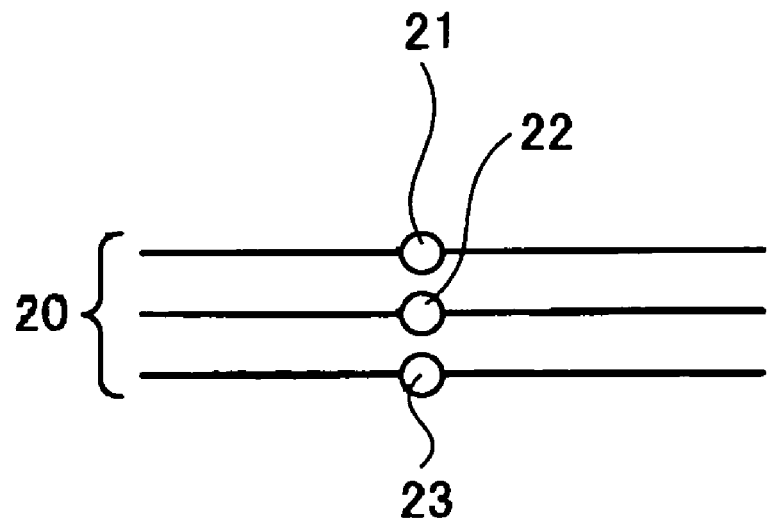
FIG. 16A is a schematic plan view showing yet a further example of the state in which beam spots of light beams are located on the optical recording medium by the optical pickup device according to the present invention.
Figure 16B:
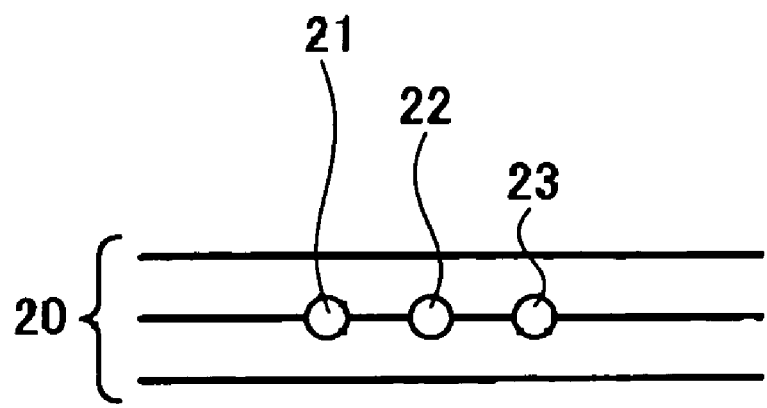
FIG. 16B is a schematic plan view showing yet a further example of the state in which beam spots of light beam are located on the optical recording medium by the optical pickup device according to the present invention.

FIGS. 16A and 16B are respectively schematic plan views showing the manner in which beam spots are located on the recording surface of the optical recording medium 9 in this case. FIG. 16A is similar to the aforementioned recording which was described so far with reference to FIG. 10. FIG. 16B shows the case in which returned light for forming the beam spot 21 and returned light for forming the beam spot 23 are not used for reproducing the RF reproduced signal but used for detecting the tilt in the tangential direction. When beam spots are located on the same track, even if the quantities of returned lights of the beam spots 21 and 23 are detected and used for reproducing RF reproduced signal, RF reproduced results are similar to that brought by the beam spot 22.

The reproduced RF signal can be detected by observing the quantity of the returned light through the photo-detector 11. Also, the fact that the gap error signal and the tilt error signal are obtained by observing the reproduced RF signal through the low-pass filter (not shown) is similar to the aforementioned fourth embodiment.

Also, similarly to the above-mentioned respective embodiments, the tilt and the gap can automatically be controlled excellently and stable and satisfactory reproduction becomes possible.

(6) Sixth Embodiment

Figure 17:
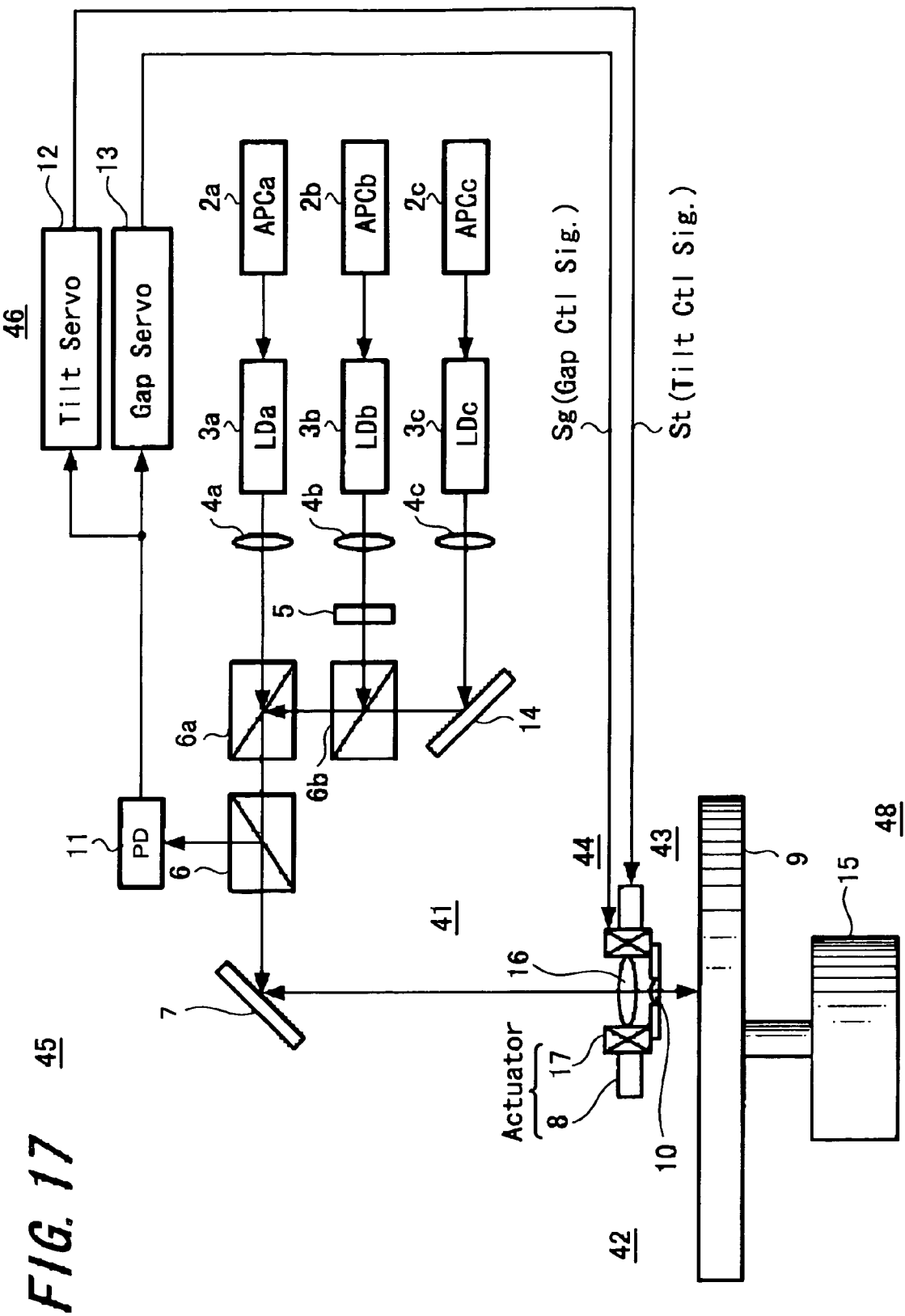
FIG. 17 is a schematic block diagram showing an arrangement of still a further example of an optical recording and reproducing apparatus including an optical pickup device according to the present invention.

Next, a sixth embodiment in which the present invention is applied to a reproducing system of a recording and reproducing apparatus required when a plurality of beam spots is formed on an optical recording medium by using a light source such as three lasers and a diffraction grating will be described with reference to a schematic block diagram of FIG. 17. In FIG. 17, elements and parts identical to those of FIGS. 1 and 11 are denoted by identical reference numerals and therefore need not be described.

Figure 18A:
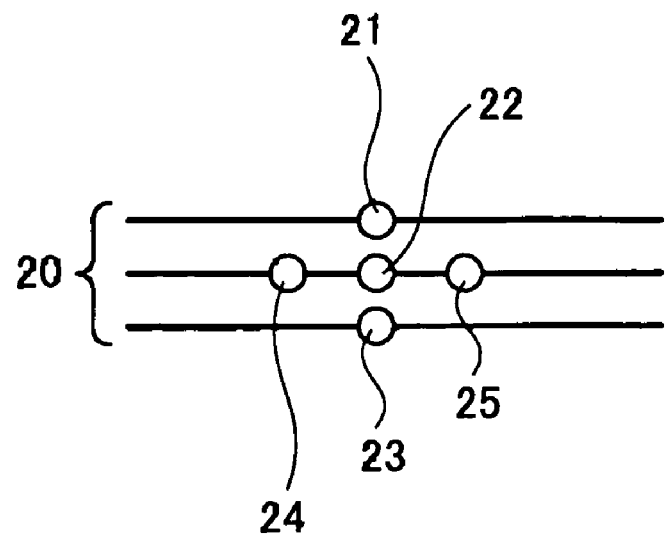
FIG. 18A is a schematic plan view showing still a further example of the state in which beam spots of light beams are located on the optical recording medium by the optical pickup device according to the present invention.
Figure 18B:
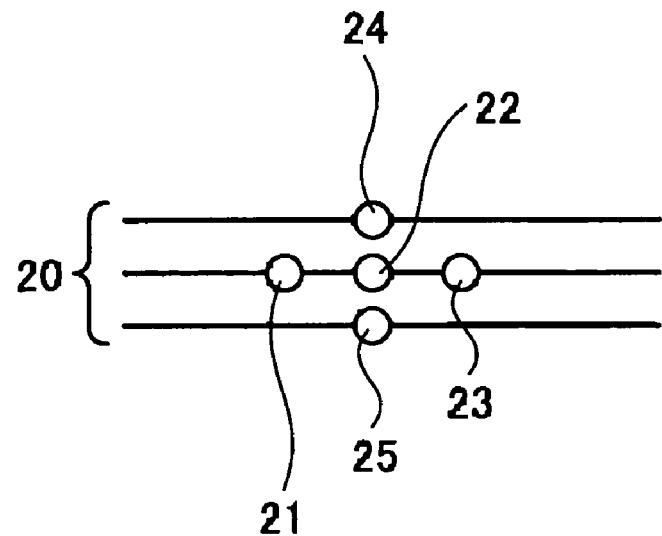
FIG. 18B is a schematic plan view showing still a further example of the state in which beam spots of light beams are located on the optical recording medium by the optical pickup device according to the present invention.

FIGS. 18A and 18B are schematic plan views showing the manner in which beam spots are located on the recording surface of the optical recording medium 9. An example shown in FIG. 18A is similar to the example of FIG. 12 described so far in the aforementioned third embodiment. An example shown in FIG. 18B shows the case in which returned light for forming the beam spot 21 and returned light for forming the beam spot 23 are not used for reproducing the RF reproduced signal but used for detecting the tilt in the tangential direction. When the quantities of returned lights of the beam spots 21 and 23 are detected and used for reproducing RF reproduced signal, RF reproduced results are similar to that brought by the beam spot 22.

Then, the tilt in the radial direction can be detected by returned light for forming the sub-spots 24 split from the beam spot 22 by the diffraction grating 5 and returned light for forming the beam spot 25. The reproduced RF signal can be detected by observing the quantity of the returned light through the photo-detector 11. Also, the fact that the gap error signal and the tilt error signal are obtained by observing the reproduced RF signal through the low-pass filter (not shown) is similar to that of the aforementioned respective embodiments.

According to this arrangement, similarly to the aforementioned third embodiment, information of three track amounts can be reproduced simultaneously and hence a reproducing transfer rate of recorded information can be increased as much as three times. Further, the tilt in the radial direction can be controlled by the returned light of light for forming the sub-spots 24 across the tracks and the returned light of light for forming the beam spot 22 and the returned light of light for forming the beam spot 25. Also, the tilt in the tangential direction can be controlled by the returned light of light for forming the beam spots 21 to 23 arrayed on one track. At the same time, the gap can be controlled with high accuracy.

As described above, since the tilt in both directions, that is, the radial direction and the tangential direction can automatically be controlled, the tilt can be decreased more reliably and hence stable and satisfactory reproduction can be carried out.

As described above, according to the present invention, when the optical recording medium using the near field light is recorded and/or reproduced, the tilt can be controlled easily and reliably and also the tilt can be controlled automatically without using the external tilt sensor. At the same time, the gap also can be controlled with high accuracy and hence the optical recording medium can be recorded and/or reproduced stably and excellently. The present invention is not limited to the above-mentioned respective embodiments and various modifications and variants are also possible without departing from the arrangement of the present invention, such as when reproduced signal and gap control returned lights are separated from each other by using a difference between polarizing directions in order to control a gap in an optical recording and reproducing apparatus, for example.

According to the optical pickup device of the present invention, in the optical pickup device using near field light in which the distance and angle between the head unit for irradiating near field light on the optical recording medium and the recording surface of the optical recording medium is detected from the quantity of returned light of a plurality of lights and in which the gap and the tilt can be decreased by automatically correcting the distance and angle between the head unit and the recording surface of the optical recording medium with the gap control unit, the gap driving unit, the tilt control unit and the tilt driving unit, the optical head unit can be stably opposed to the optical recording medium without using the external gap sensor and tilt sensor.

Also, according to the present invention, it is possible to provide the optical pickup device including the gap driving unit and the gap control unit and in which both of the tilt and the gap can be automatically controlled by controlling the distance between the optical head unit and the recording surface of the optical recording medium based on the quantities of the returned lights detected by using a plurality of light beams.

Also, in the optical pickup device according to the present invention, since light from the light source is split by a suitable means such as a diffraction grating and a plurality of light beams is used, the tilt can be controlled relatively by the optical pickup device of the relatively simple arrangement.

Also, in the optical pickup device according to the present invention, the sufficient quantity of returned lights can be obtained by using light beams from a plurality of light sources and hence the tilt can be controlled with high accuracy.

Further, when the distance between the head unit and the recording surface of the optical recording medium is less than a distance in which near field light is produced, that is, it is a distance selected to be approximately ¼ of a wavelength of incident light, since a part of light introduced at an angle in which incident light is totally reflected is leaked from the end face of the suitable lens such as the SIL at the tip end side of the optical head unit, the quantity of returned light is decreased in response to the distance. When the lens has the tilt, if the quantity of the returned light is detected by irradiating the optical recording medium with a plurality of lights, then since the distance between the optical head unit and the recording surface becomes different depending on the amount of tilt, the quantity of returned light becomes different. As a result, it is possible to easily detect the amount of tilt, that is, the angle between the optical head unit and the recording surface by detecting this difference.

Therefore, in the optical pickup device according to the present invention, it is possible to easily and reliably detect the angle between the head unit and the recording surface of the optical recording medium by using the tilt detection method of the present invention in which the angle is detected from the difference between at least two detected values of quantities of a plurality of light beams.

Also, in the optical pickup apparatus according to the present invention, when the distance between the head unit and the recording surface of the optical recording medium is detected, since the distance is detected by the mean value of the quantities of a plurality of returned light beams or the quantity of the returned light at the central position if light has odd number of beam spots or the mean value of the two quantities of returned lights at the central position if light has even number of beam spots, it is possible to provide the optical pickup device in which the distance between the head unit and the recording surface can be easily and relatively detected in addition to the detection of the tilt and which can automatically control the tilt and the gap.

Also, since the optical recording and reproducing apparatus is constructed by using the optical pickup device according to the present invention, it is possible to provide the optical recording and reproducing apparatus using near field light in which the tilt of the head unit for irradiating near field light on the optical recording medium can be decreased, the head unit can be opposed to the recording surface of the optical recording medium more stably to record and/or reproduce the optical recording medium and which is excellent in recording and reproducing characteristics.

Further, in the optical recording and reproducing apparatus according to the present invention, since gap control for adjusting the distance between the head unit and the recording surface of the optical recording medium is executed by using quantities of a plurality of returned lights, it is possible to provide the optical recording and reproducing apparatus in which the head unit can be opposed to the optical recording medium more reliably to stably record and/or reproduce the optical recording medium.

It should be understood by those skilled in the art that various modifications, combinations, sub-combinations and alterations may occur depending on design requirements and other factors insofar as they are within the scope of the appended claims or the equivalents thereof.

What is claimed is:

1. An optical pickup device comprising:
   a light source configured to generate a plurality of light beams, said plurality of light beams including a first light beam and a second light beam;
   a head unit located in an opposing relation to an optical recording medium and configured to irradiate said plurality of light beams emitted from said light source on said optical recording medium as near field lights so as to form a plurality of light beam spots on said optical recording medium; and
   a photo-detecting unit configured to detect a plurality of quantities of returned light respectively of said plurality of light beams returned from said head unit so as to detect a gap between said head unit and a recording surface of said optical recording medium based on at least one of said plurality of quantities of returned light, and so as to detect a tilt angle of said head unit relative to said recording surface of said optical recording medium based on a difference between two quantities of returned light from among said plurality of quantities of returned light, said two quantities of returned light being quantities of returned light respectively of said first light beam and said second light beam that are returned from said head unit,
   wherein said head unit includes a first lens and a second lens located between said first lens and said optical recording medium, and wherein said second lens is configured to generate near field light.

2. An optical pickup device according to claim 1, wherein said light source is configured to generate said plurality of light beams by splitting light from a laser diode.

3. An optical pickup device according to claim 1, wherein said light source includes a plurality of laser diodes such that said plurality of light beams are generated by said plurality of laser diodes.

4. An optical pickup device according to claim 1, wherein said second lens is a solid immersion lens.

5. An optical pickup device according to claim 1, wherein said photo-detecting unit detects a gap between said head unit and a recording surface of said optical recording medium based on a quantity of returned light reflected on said second lens at its end face opposing said optical recording medium.

6. An optical pickup device according to claim 1, further comprising:
   a gap driving unit configured to adjust a distance between said head unit and said recording surface of said optical recording medium; and
   a gap control unit configured to control said gap driving unit based on said distance detected by said photo-detecting unit so that a distance of said head unit relative to said recording surface is held constant.

7. An optical pickup device according to claim 1, wherein when a distance between said head unit and said recording surface of said optical recording medium is detected based on more than one of said plurality of quantities of returned light,
   said distance is detected based on a mean value of quantities of said more than one of said plurality of quantities of returned light, or
   said distance is detected based on a quantity of returned light at a central position if said plurality of light beams form an odd number of beam spots on said optical recording medium, or
   said distance is detected based on a mean value of quantities of two returned light beams at the central position if said plurality of light beams form an even number of beam spots on said optical recording medium.

8. An optical pickup device according to claim 1, further comprising:
- a tilt driving unit configured to adjust an angle between said head unit and said recording surface of said optical recording medium; and
- a tilt control unit configured to control said tilt driving unit based on said tilt angle detected by said photo-detecting unit so that an angle of said head unit relative to said recording surface is held constant.

9. An optical pickup device comprising:
- a light source configured to generate a plurality of light beams, said plurality of light beams including a first light beam and a second light beam;
- a head unit including first and second lenses, said second lens being located in an opposing relation to an optical recording medium and being configured to converge said plurality of light beams emitted from said light source to generate near field light toward said optical recording medium; and
- a photo-detecting unit configured to detect a plurality of quantities of returned light respectively of said plurality of light beams returned from said head unit so as to detect a tilt angle of said head unit relative to a recording surface of said optical recording medium based on a difference between two quantities of returned light from among said plurality of quantities of returned light, said two quantities of returned light being quantities of returned light respectively of said first light beam and said second light beam that are returned from said head unit, wherein said head unit generates near field light by said second lens at its end face opposing said optical recording medium and reflects said plurality of light beams introduced from said light source at said end face.

10. An optical pickup device according to claim 9, wherein said light source is configured to generate said plurality of light beams by splitting light from a laser diode.

11. An optical pickup device according to claim 9, wherein said light source includes a plurality of laser diodes such that said plurality of light beams are generated by said plurality of laser diodes.

12. An optical pickup device according to claim 9, wherein said photo-detecting unit is configured to detect a gap between said head unit and said recording surface of said optical recording medium based on at least one of said plurality of quantities of returned light reflected by said second lens at its end face opposing said optical recording medium.

13. An optical pickup device according to claim 12, wherein when a distance between said head unit and said recording surface of said optical recording medium is detected based on more than one of said plurality of quantities of returned lights,
- said distance is detected based on a mean value of quantities of said more than one of said plurality of quantities of returned light, or
- said distance is detected based on a quantity of returned light at a central position if said plurality of light beams form an odd number of beam spots on said optical recording medium, or
- said distance is detected based on a mean value of quantities of two returned light beams at the central position if said plurality of light beams form an even number of beam spots on said optical recording medium.

14. An optical pickup device according to claim 9, further comprising:
- a gap driving unit configured to adjust a distance between said head unit and said recording surface of said optical recording medium; and
- a gap control unit configured to control said gap driving unit based on said distance detected by said photo-detecting unit so that a distance of said head unit relative to said recording surface is held constant.

15. An optical pickup device according to claim 9, further comprising:
- a tilt driving unit configured to adjust an angle between said head unit and said recording surface of said optical recording medium; and
- a tilt control unit configured to control said tilt driving unit based on said tilt angle detected by said photo-detecting unit so that an angle of said head unit relative to recording surface is held constant.

16. An optical recording and reproducing apparatus for recording and/or reproducing an optical recording medium by irradiating said optical recording medium with light from a light source, comprising:
- a light source configured to generate a plurality of light beams, said plurality of light beams including a first light beam and a second light beam;
- a head unit located in an opposing relation to said optical recording medium and configured to irradiate said plurality of light beams emitted from said light source on said optical recording medium as near field light so as to form a plurality of light beam spots on said optical recording medium; and
- a photo-detecting unit configured to detect a plurality of quantities of returned light respectively of said plurality of light beams returned from said head unit so as to detect a gap between said head unit and a recording surface of said optical recording medium based on at least one of said plurality of quantities of returned light, and so as to detect a tilt angle of said head unit relative to said recording surface of said optical recording medium based on a difference between two quantities of returned light from among said plurality of quantities of returned light, said two quantities of returned light being quantities of returned light respectively of said first light beam and said second light beam that are returned from said head unit,
- wherein said head unit includes a first lens and a second lens located between said first lens and said optical recording medium, and wherein said second lens is configured to generate near field light.

17. An optical recording and reproducing apparatus according to claim 16, further comprising:
- a gap driving unit configured to adjust a gap between said head unit and said recording surface of said optical recording medium; and
- a gap control unit configured to control said gap driving unit based on said gap detected by said photo-detecting unit so that a distance of said head unit relative to said recording surface is held constant.

18. An optical recording and reproducing apparatus according to claim 16, further comprising:
- a tilt driving unit configured to adjust an angle between said head unit and said recording surface of said optical recording medium; and
- a tilt control unit configured to control said tilt driving unit based on said tilt angle detected by said photo-detecting unit so that an angle of said head unit relative to said recording surface is held constant.

19. A detection method comprising the steps of:
- emitting a plurality of light beams from a light source to a head unit, said plurality of light beams including a first light beam and a second light beam;

irradiating the plurality of light beams on an optical recording medium though said head unit so as to generate a plurality of near field lights;

detecting a plurality of quantities of returned light respectively of said plurality of light beams returned from said head unit; and detecting a tilt angle between a recording surface of said optical recording medium and said head unit based on a difference between two quantities of returned light from among said plurality of quantities of returned light, said two quantities of returned light being quantities of returned light respectively of said first light beam and said second light beam that are returned from said head unit.

* * * * *